(No Model.) 4 Sheets—Sheet 1.
C. HEISLER.
PROCESS OF MANUFACTURING CARBONS.
No. 428,604. Patented May 27, 1890.
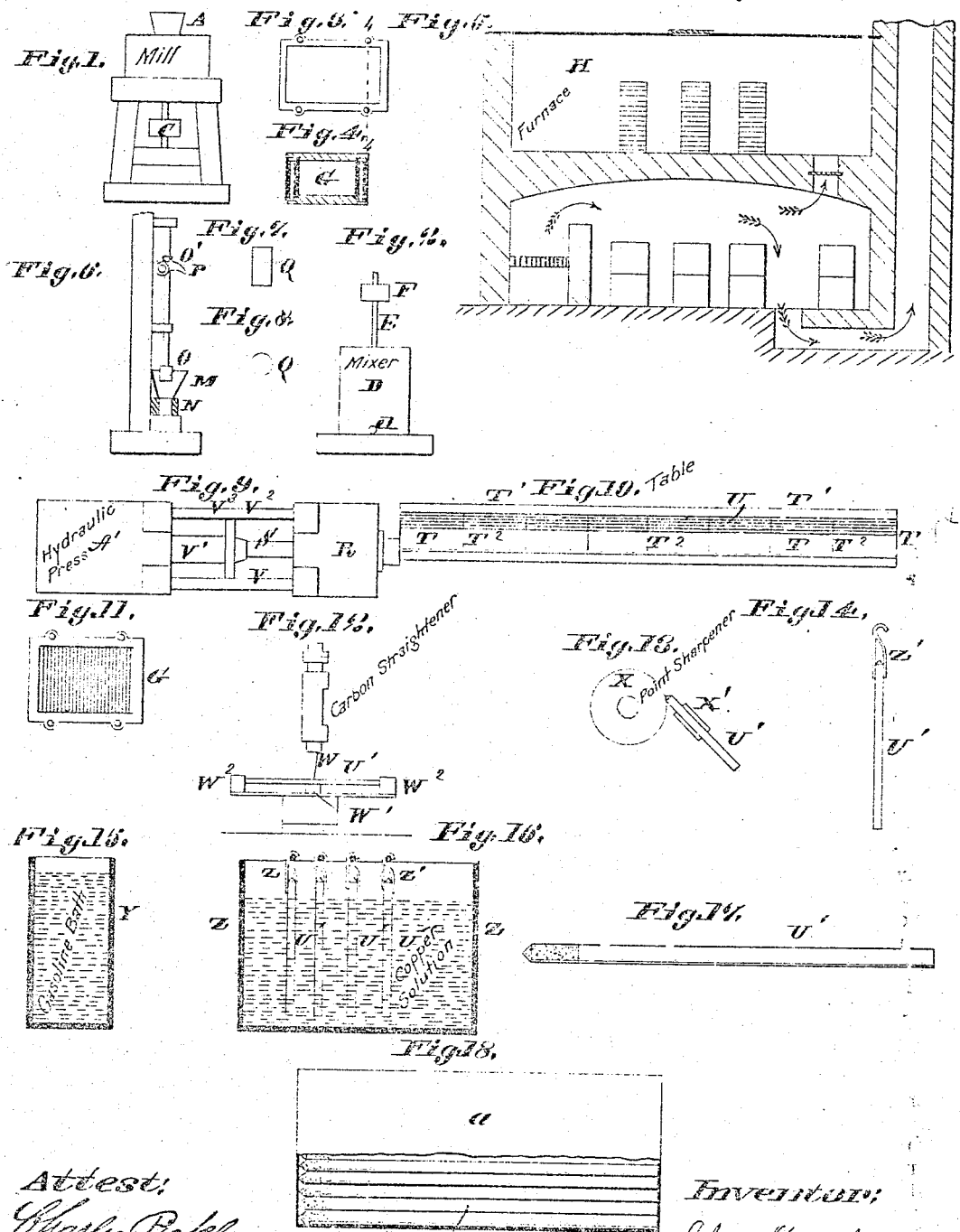

(No Model.)
C. HEISLER.
PROCESS OF MANUFACTURING CARBONS.
No. 428,604. Patented May 27, 1890.
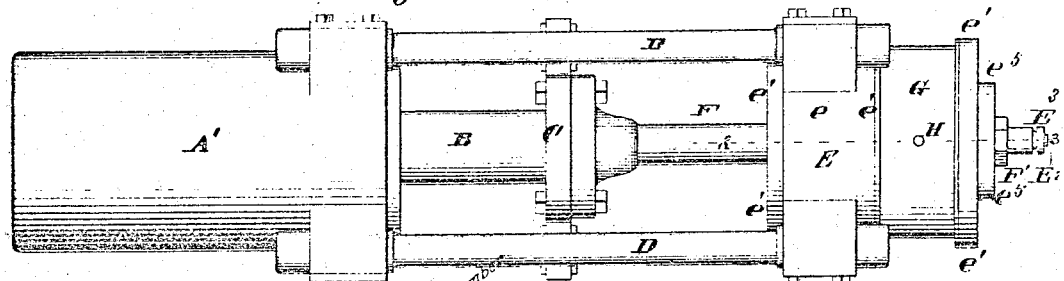
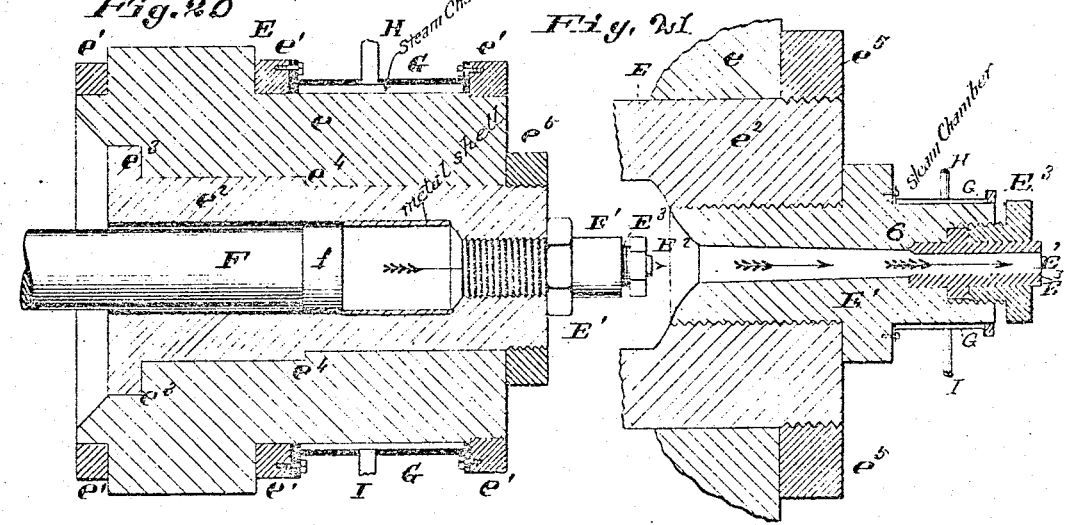
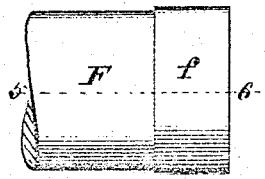 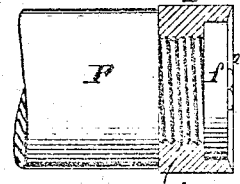 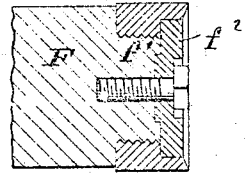
Attest:
Charles Pickels
F. L. Middleton
Inventor:
Chas. Heisler
by Ellis Spear
Atty (No Model.)  4 Sheets—Sheet 3.
C. HEISLER.
PROCESS OF MANUFACTURING CARBONS.
No. 428,604.  Patented May 27, 1890.
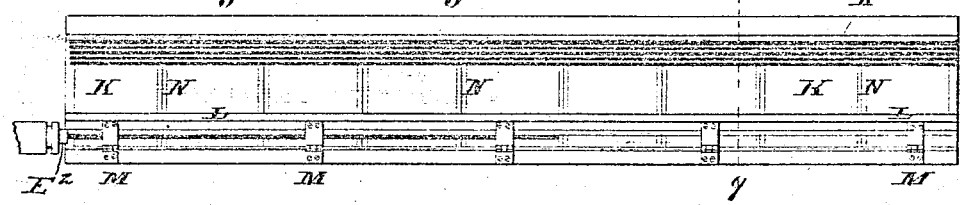
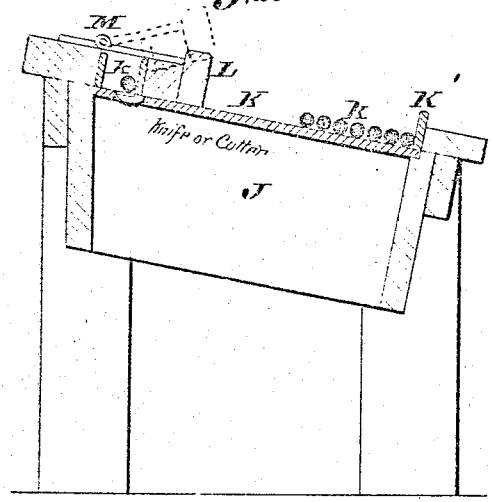
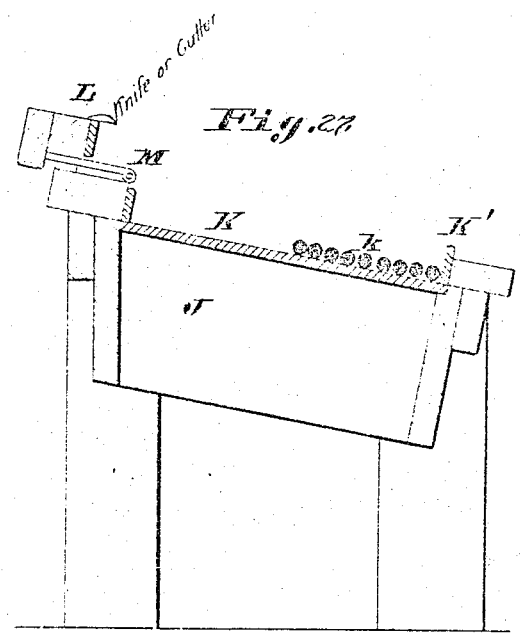

(No Model.) 4 Sheets—Sheet 4.

C. HEISLER.
PROCESS OF MANUFACTURING CARBONS.

No. 428,604. Patented May 27, 1890.

Attest:
Charles Pohle
F. L. Middleton

Inventor:
Chas. Heisler
By Ellis Spear
Atty

UNITED STATES PATENT OFFICE.

CHARLES HEISLER, OF ST. LOUIS, MISSOURI, ASSIGNOR TO THE UNITED GAS IMPROVEMENT COMPANY, OF PHILADELPHIA, PENNSYLVANIA.

PROCESS OF MANUFACTURING CARBONS.

SPECIFICATION forming part of Letters Patent No. 428,604, dated May 27, 1890.

Application filed May 5, 1887. Serial No. 237,247. (No model.)

*To all whom it may concern:*

Be it known that I, CHARLES HEISLER, of St. Louis, in the county of St. Louis and State of Missouri, have invented a new and useful Improvement in Process of Manufacturing Carbons; and I do hereby declare that the following is a full, clear, and exact description of the same.

My invention relates to the manufacture of carbon pencils used in arc lamps, and includes an improved process or method which is carried out in successive steps by independent mechanical devices.

Figure 28:
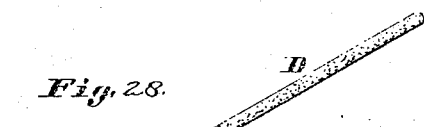
Figure 29:
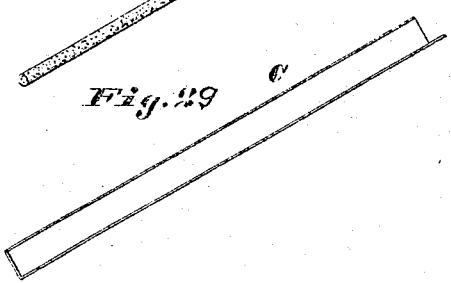
Figure 30:
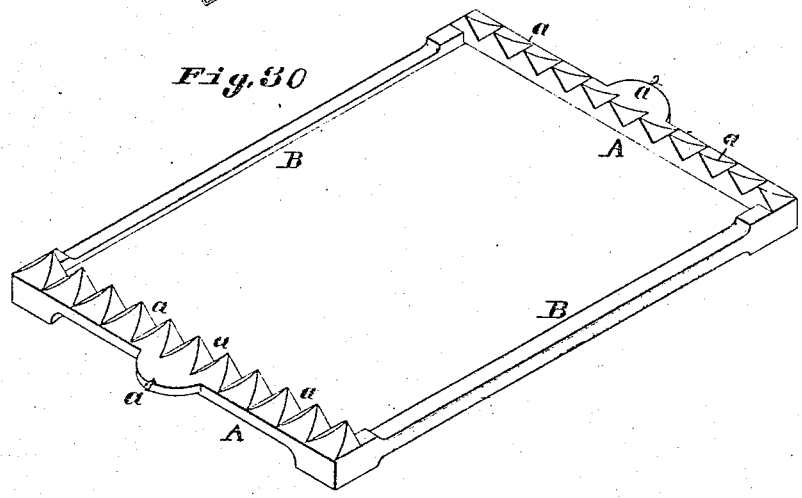
Figure 31:
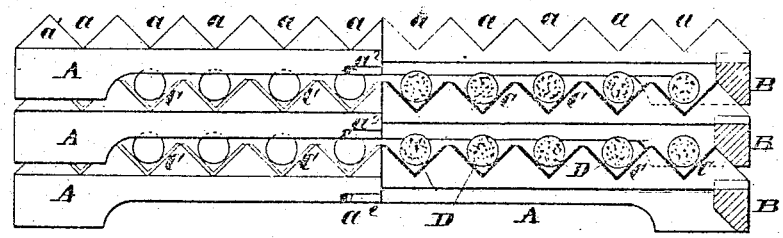

In the drawings, Figures 1 to 18, inclusive, on Sheet 1 represent the various details used in the manufacture of carbons by my improved method. Figs. 19, 20, 21, 22, 23, and 24 represent in side elevation and in section the press and plunger for forming the carbon into the pencil shape. Figs. 25, 26, and 27 represent the table adjacent to the press for receiving the pencils after they are formed in said press. Figs. 28, 29, 30, and 31 represent the details relating to the racks for holding the carbons during the time they are baked.

It will be observed from the drawings that the complete process represented upon Sheet 1 is carried out by mechanical devices and sub-processes for the various steps, which will all be hereinafter set forth, and particularly claimed.

In Fig. 1 a mill, which may be of any suitable construction, is shown at A, in which the material of which the carbons are to be composed is placed and ground to a finely-powdered condition. This material thus ground is mixed in a suitable mixer, as shown at D, Fig. 2. This ground and mixed material is next fed into a hopper M of a press provided with a plunger O, as shown in Fig. 6. Beneath the bore of the press is placed a shell open at both ends, (marked Q, Figs. 7 and 8,) and the plunger O presses the ground and mixed carbon into these shells or cases until they are full, and as one is filled it is removed and an empty one put in its place. By the use of the short cylinders or shells I am enabled to handle the material conveniently in its transmission from the mass in the mixer to the chamber of the hydraulic press, and also to accurately determine the amount of material for each charge. The filled shells are placed within the bore of a press, (shown at A′ in Fig. 9,) which will be hereinafter particularly described, and a plunger working in said bore forces the material from its case through the contracted mouth of the press, discharging it upon a table T, as in Fig. 10, the material as thus discharged being of proper diameter for use. The carbons, after they are discharged upon the tables, are cut into the proper lengths by a suitable knife, as shown in Figs. 26 and 27, and are then placed in a suitable frame adapted to hold them separate and to receive tier after tier, which are then placed in a drying compartment of the furnace H, after which they are removed to another chamber in said furnace, where they are subjected to a thorough baking. After their removal from the furnace each carbon is taken and passed through a suitable straightening device, such as represented in diagram, Fig. 12, at W. The carbons U′ are then sharpened on their points on a suitable grinding apparatus, as shown at X in Fig. 13. Holders Z′ are then applied to the ends of the carbons, and they are dipped into a bath of gasoline or similar material, which fills all their pores, and after this bath they are dipped into the ordinary copper solution, as at Z in Fig. 16. They are then ready for use and may be packed in boxes for shipment.

While ordinary mechanical devices may be utilized to carry out the different steps of the process described as a whole, I have shown specific mechanism for forming the carbons, and will now describe these devices, and also a process for filling the pores of the carbons with gas prior to the ordinary coating of the same by copper solution.

Taking these devices up in their order, I will first refer to the forming-press and receiving-table combined therewith. (Shown in Figs. 19 to 24, inclusive, Sheet 2.) In these figures, E represents the chamber in which the plunger F works, the said plunger having a cap *f* screwed on the same, of a little larger diameter than the plunger, this cap being made of phosphor-bronze or similar material. The plunger is operated by any convenient mechanism, as the compressor A′, and in its forward movement the cap *f* enters the metal shell containing the carbon out of which the pencils are to be formed, which are placed in the chamber E in the forward end thereof. A separate bore E' is preferably formed separate from the chamber A' and screwed into the same, as shown in Figs. 20 and 21, and the passage through this part E' is smaller than the diameter in which the shell is placed, tapering down to a point 6, where the bore $E^2$ begins, of uniform diameter throughout, which is formed in a piece $E^3$, which is inserted into the end of the piece E'. As the plunger F is advanced the head $f$ enters the metal shell and forces the carbon contained therein through the tapering channel in the part E', and thence through the channel in the part $E^3$, discharging it upon the table J, as shown in Fig. 25, the nozzle of the forming-press being in proximity to the edge of the table.

It is very desirable during the formation of the carbon pencils in the forming-press to raise or lower the temperature, in order to facilitate the work and make the result more perfect. To this end I place a diaphragm, as shown in Fig. 21 at G, around the periphery of the part E', which constitutes the nozzle of the press, this diaphragm forming a chamber entirely around the periphery, into which chamber pipes I open, which may be in connection with a heating and cooling medium, and thus at will heat or cool the carbon as it passes through the nozzle of the press. The table, which is shown in Figs. 25 and 27, is adapted to receive the carbon from the nozzle of the press and to hold it in line with the nozzle by means of the pivoted holder L. The table is formed with an inclined face, and the holder forms a little compartment at the upper edge, into which the carbon is discharged. Upon its extreme outer edge the holder is provided with a knife, and when it is lifted to allow the carbon to run down the inclined table to the lower part thereof the knife separates the pencil from the material still contained within the nozzle.

Before applying the carbon to the ordinary bath of copper in solution I find that greatly-improved results follow from filling the pores with gas, which prevents the penetration by the copper to the interior of the carbon and keeps it simply as a coating upon its outer surface. This bath is of gasoline or similar material, and the carbons are simply dipped into it, and the gaseous products of said fluids which remain in the pores of the carbon are proof against the penetration of the copper solution when the copper is applied to said bath.

I claim as my invention—

1. The improved process of forming carbon pencils, consisting in pressing the ground and moistened carbons into short cylinders and in forcing the contents of the cylinders through a forming-press, so as to obtain pencils of the proper diameter, substantially as described.

2. In the manufacture of carbon pencils, the described method of preventing the penetration of the ordinary copper coating, consisting in first applying the carbon to a bath of gasoline, substantially as described.

In testimony whereof I have signed my name to this specification in the presence of two subscribing witnesses.

CHAS. HEISLER.

Witnesses:
 MOSES B. MACLAY,
 ARCHIBALD MACLAY.